United States Patent Office 3,138,742
Patented June 23, 1964

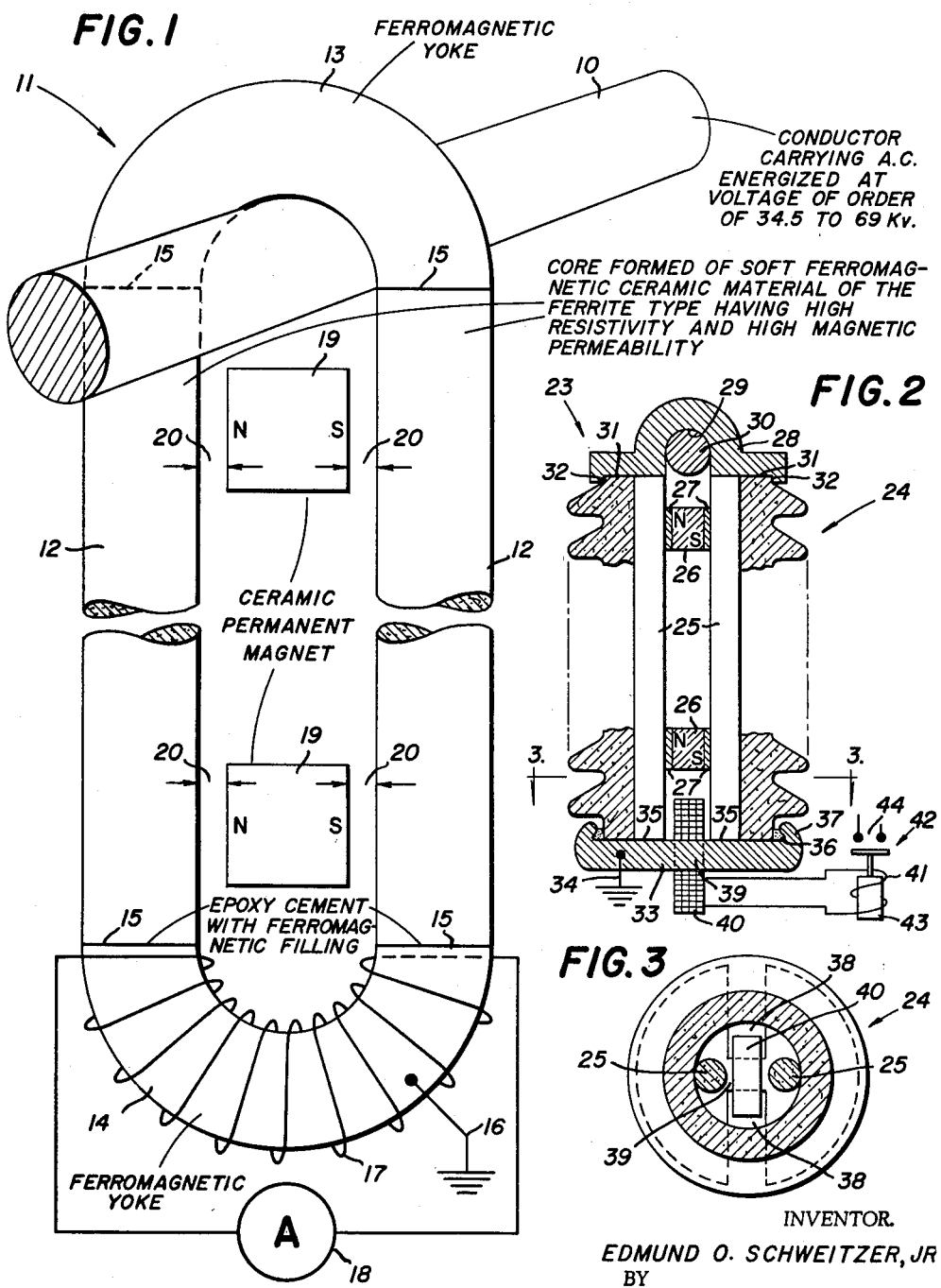

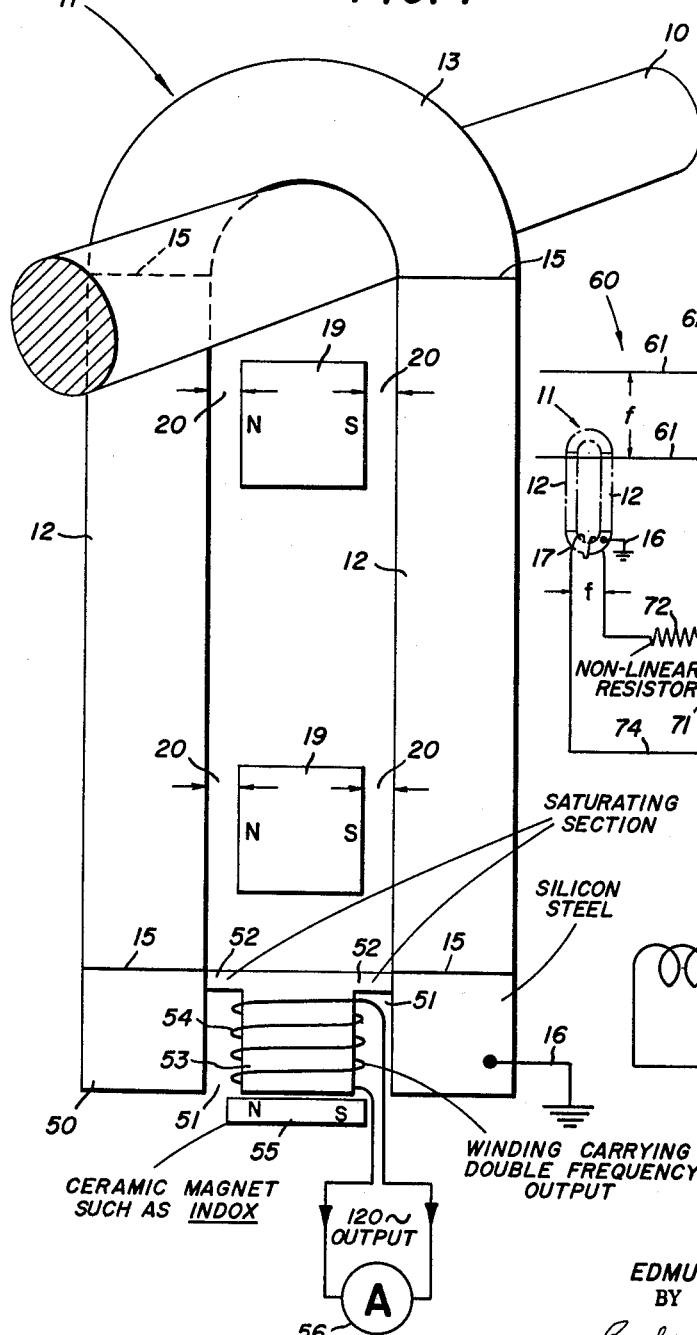
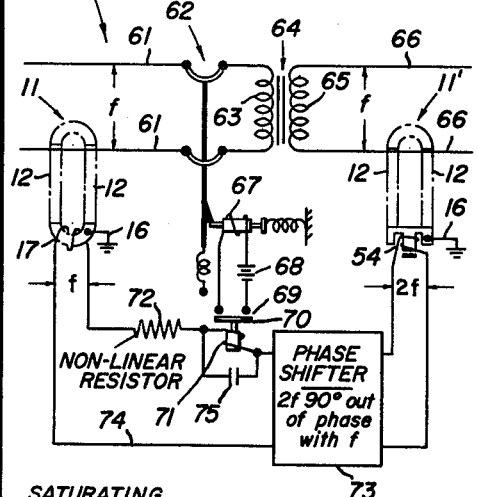
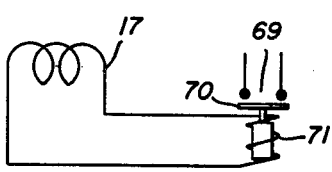

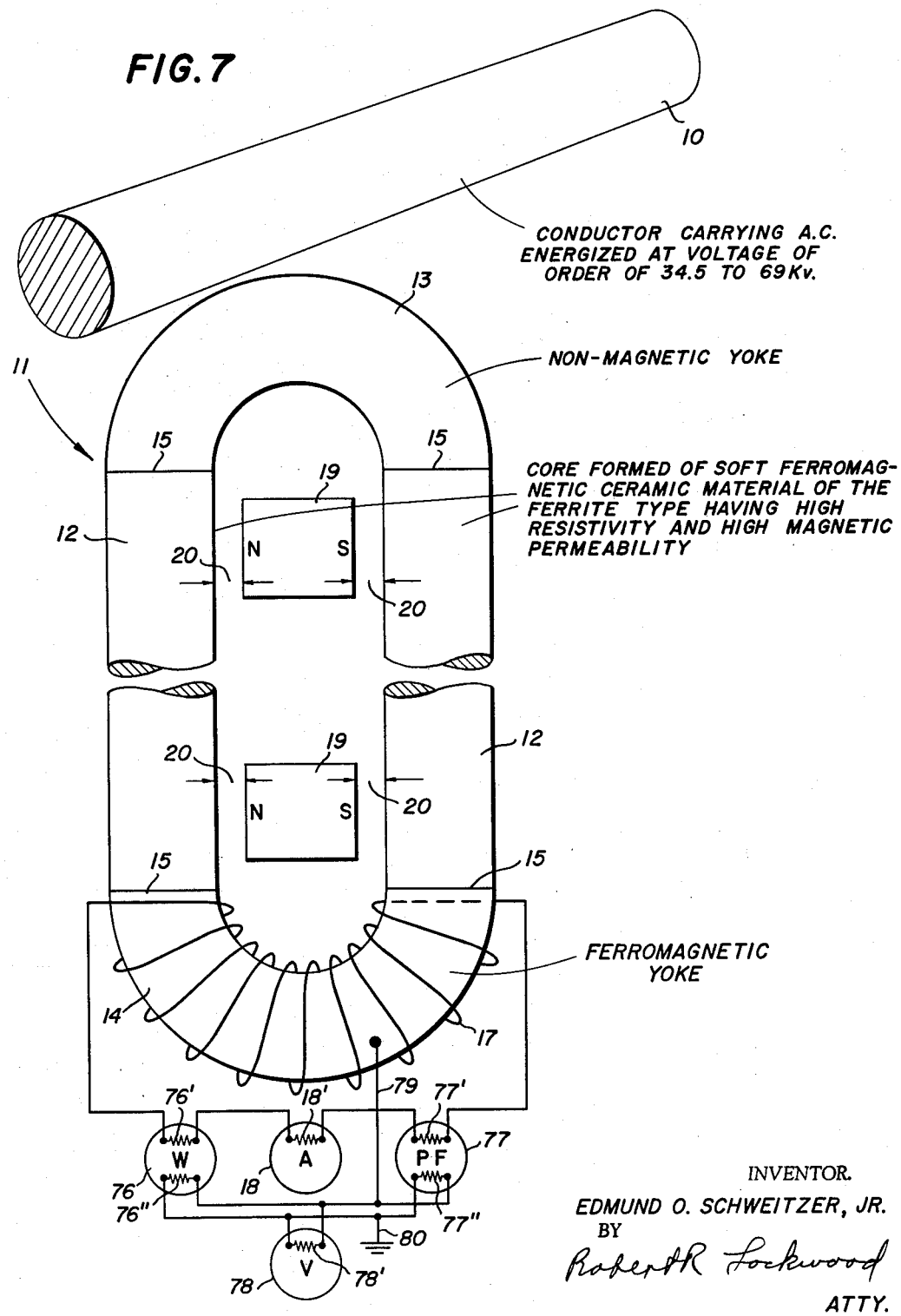

3,138,742
MEANS FOR MEASURING CURRENT FLOW IN AND VOLTAGE OF A HIGH VOLTAGE ALTERNATING CURRENT CONDUCTOR
Edmund O. Schweitzer, Jr., 1002 Dundee Road, Northbrook, Ill.
Filed Feb. 13, 1962, Ser. No. 173,011
20 Claims. (Cl. 317—27)

This invention relates, generally, to measuring means and it has particular relation to the measurement of current flow in and voltage of a high voltage alternating current conductor. This application is a continuation-in-part of application Serial No. 159,509, filed December 15, 1961, now abandoned.

Among the objects of this invention are: To provide improved means for measuring the flow of alternating current in and the voltage of a conductor of an alternating current transmission system energized at high voltage, for example at voltages of the order of 34.5 to 69 kv.; to employ for this purpose an elongated generally O-shaped core having the sides formed of ferromagnetic ceramic material of the ferrite type having relatively high resistivity and high magnetic permeability; to position one end of the core in close proximity to the energized conductor where it links the same or links the magnetic field surrounding it and has alternating magnetic flux induced therein while positioning the other end in close proximity to or in connection with ground; to mount a current coil on the other or grounded end of the core for induction therein of alternating current the magnitude of which varies in accordance with the current flow in the conductor; to measure the voltage of the conductor with respect to ground by measuring the flow of leakage current between the other end of the core and ground; to apply the current flow thus obtained to a wattmeter for measuring the flow of power in the conductor and a power factor meter to indicate the phase angle between the current in and the voltage of the conductor; to reduce the leakage of alternating flux between the sides of the elongated O-shaped core; to position one or more permanent magnets between the sides of the O-shaped core for reducing the leakage flux, the magnets, if two or more are used, acting in the same direction; to enclose the sides of the O-shaped core within an insulating housing the resistance of which is at least equal to the resistance of the core; to form the insulating housing of ceramic material and integrally with the sides of the O-shaped core; and to interconnect the ends of the sides of the O-shaped core by ferromagnetic yokes; to construct the grounded end of the elongated generally O-shaped core in such manner as to induce in the current coil thereon alternating current having a frequency twice that of the frequency of the alternating current in the conductor at the other end of the core; to employ two of the cores in a power transmission system on opposite sides of a transformer for detecting a fault in the transformer by differential action; and to obtain a direct current component as a result of such differential action to trip a circuit interrupter and deenergize the transformer.

In the drawings:

FIG. 1 illustrates, somewhat diagrammatically, a current measuring system for use with a high voltage alternating conductor embodying this invention.

FIG. 2 is a vertical sectional view showing the current measuring means illustrated in FIG. 1 enclosed in an insulating housing.

FIG. 3 is a horizontal sectional view taken generally along the line 3—3 of FIG. 2.

FIG. 4 shows a modification of the construction shown in FIG. 1.

FIG. 5 shows diagrammatically how this invention can be employed for the differential protection of a transformer.

FIG. 6 shows a modification of the system shown in FIG. 5.

FIG. 7 shows a further modification of the invention in which the magnetic core is positioned in the magnetic field generated by current flow in the conductor but not mechanically linking it with provision made for measuring power flow and power factor.

Referring now particularly to FIG. 1 of the drawings, it will be observed that the reference character 10 designates a conductor carrying alternating current and energized at a voltage of the order of 34.5 to 69 kv. It will be understood that the conductor 10 ordinarily forms one of three conductors of a three phase system which may be grounded and that it may be energized at voltages other than the specified voltages. Also the conductor 10 can form a part of a single phase system or one conductor thereof with the other side or conductor being grounded.

In accordance with this invention provision is made for measuring the current flow in the conductor 10 by employing a generally elongated O-shaped core that is indicated, generally, at 11. The core 11 is formed of a material which, while having high insulating properties, also is capable of conducting magnetic flux. Thus one end of the core 11 can be associated closely with the energized conductor 10 while the other end which is spaced from the conductor 10, is effectively insulated therefrom and can be grounded. By placing the core 11 around the conductor 10 and the latter at one end, as shown in FIG. 1, it is possible to induce alternating magnetic flux in the core 11 and to measure the alternating magnetic flux at the other or grounded end at a location which is effectively insulated from the conductor 10. As described hereinafter the core 11 can be positioned in the magnetic field surrounding the conductor 10 but not linking it.

Preferably the core 11 or the sides 12—12 thereof is formed of ferromagnetic ceramic material of the ferrite type having relatively high resistivity and high magnetic permeability. A yoke 13 bridges the upper ends of the sides 12—12, which may be in the form of rods having circular cross sections, the yoke being formed of ferromagnetic material and having a groove on the underside conforming to the shape of the conductor 10. At their lower ends the sides 12—12 of the core 11 are interconnected by a yoke 14 of ferromagnetic material. If desired, the sides 12—12 and yoke 14 can be formed of the same material, i.e., ferromagnetic ceramic material of the ferrite type having relatively high resistivity and high magnetic permeability, so that together they provide a generally U-shape. For securing the yoke 13 and the yoke 14, if used, to the respective ends of the sides 12—12 an epoxy cement, as indicated at 15, can be employed, the epoxy cement preferably having a filling of magnetic material to provide a minimum of reluctance at the junctures.

Now it will be apparent that the upper end of the core 11 is energized at substantially the same voltage as the conductor 10 since the yoke 13 overlies the conductor 10 and thus is in close proximity thereto. However, since the sides 12—12 of the core 11 are formed of a material which has a high resistivity, the lower end or the yoke 14, if used, can be grounded at 16. Since the resistivity of the material forming the sides 12—12 of the order of $10^7$ ohms, it is possible to ground the lower end of the core 11 while its upper end is energized at the voltage of the conductor 10.

Surrounding the lower end of the core 11 or the yoke 14, if used, is a current measuring winding 17 into which alternating current is induced as the result of the alternating magnetic flux that is induced into the core 11 by current flowing through the conductor 10. Current responsive means 18 in the form of an alternating current ammeter is connected across the terminals of the winding 17 to measure the current flow therethrough. It will be understood that, instead of the ammeter 18, a winding of a current responsive relay can be connected across the terminals of the winding 17. For example, the operating winding of a current responsive overload relay can be connected for energization to the winding 17 and arranged to close or open contacts on flow of predetermined current in the conductor 10 to effect an operation, such as the tripping of the circuit breaker or other function as may be desired.

It will be observed that the sides 12—12 of the core 11 are relatively long as compared to the diameter of the conductor 10. The reason for this arrangement is to provide sufficient resistance between the ends of the core 11 so that a minimum of leakage current will flow therebetween. Because of the elongated construction of the core 11, a substantial amount of leakage flux flows between the sides 12—12. In order to reduce the amount of leakage flux between the sides 12—12 means are provided for generating a unidirectional magnetic field or fields between the sides 12—12. As illustrated in the drawing one or more unidirectional magnetic fields are generated by interposing ceramic permanent magnets 19—19 between the sides 12—12 at spaced locations therealong. Improved results are obtained by providing gaps 20—20 at the ends of the respective permanent magnets 19—19. Since the magnets 19—19 are formed of ceramic magnetic material, the resistance of which is about the same as the resistance of the sides 12—12, they do not introduce between the ends of the core 11 conducting paths which otherwise might reduce the effective insulation of the core 11 between the conductor 10 and ground 16. It will be observed that the permanent magnets 19—19 act in the same direction, i.e., they are in parallel rather than in series arrangement.

Referring now particularly to FIG. 2 of the drawing it will be observed that the reference character 23 designates, generally, a composite core and insulator which includes a hollow ceramic housing 24 preferably formed of wet process porcelain and having over its outer surface conventional petticoats to increase the surface leakage resistance and improve the flashover value between its ends. Within the hollow ceramic housing 24 are located sides 25—25, corresponding to the sides 12—12, and forming the principal intermediate portions of an elongated O-shaped core. As previously described the sides 25—25 preferably are in the form of rods having cylindrical cross sections. Since the sides 25—25 are formed of ceramic material, they can be cast integrally with the hollow ceramic housing 24 of wet process porcelain so that an integral construction is provided. For the purpose outlined hereinbefore permanent magnets 26—26 are interposed between the sides 25—25. They are held in position by insulating spacing material 27—27.

The upper end of the hollow ceramic housing 24 is closed by an upper end cap 28 of ferromagnetic material. It has a groove 29 on its under side for receiving a conductor 30 in which alternating current flows the magnitude of which is to be measured. The upper end cap 28 is secured to the upper ends of the sides 25—25 by epoxy cement 31 having a magnetic filling and it is secured by conventional cement 32 to the upper end of the hollow ceramic housing 24.

The lower end of the hollow ceramic housing 24 is closed by a lower end cap 33 of ferromagnetic material which can be grounded as indicated at 34. The lower ends of the sides 25—25 are secured by epoxy cement 35 having a magnetic filling to the upper side of the lower end cap 33 while a conventional cement 36 secured it to the lower end of the hollow ceramic housing 24, the cement 36 being located within an upstanding flange 37 from the lower end cap 33.

As shown more clearly in FIG. 3 of the drawings slots 38—38 are provided in the lower end cap 33 for receiving a current measuring coil 40 which corresponds to the winding 17 previously described. The amount of current induced in the current measuring coil 40 is a function of the amount of alternating current flowing through the conductor 30. The current measuring coil 40 can be connected to an indicating device such as an ammeter or it can be connected, as shown, to a winding 41 of a current responsive relay that is indicated, generally, at 42. In accordance with conventional practice the relay 42 includes an armature 43 that is arranged to control the closure of normally open contacts 44. In effect the relay 42 is an overcurrent relay and its contacts 44 are arranged to be closed on the occurrence of a predetermined flow of current in the conductor 30 to effect certain control operations well understood by those skilled in the art.

The present invention can be employed in the systems shown in my copending application Serial No. 118,484, filed May 15, 1961, to provide at ground potential a flow of alternating current that is a function of the flow of alternating current in the conductor at high potential. The current flow at low potential can be employed either directly to operate a relay as shown in FIG. 2 or it can be employed as disclosed in the copending application to provide a fundamental frequency and its second harmonic for control purposes as there disclosed.

Referring now particularly to FIG. 4 of the drawings, it will be observed that the elongated O-shaped core, shown generally at 11', is similar to the core 11 shown in FIG. 1. However, the core 11' is so arranged and constructed at the grounded end that alternating current is induced in a winding or current coil having a frequency which is twice that of the frequency of the alternating current flowing in the high voltage alternating current conductor 10. In order to provide for such induction the ends of the sides 12—12 are interconnected by a magnetic member 50 in the form of an outstanding E-shaped section. The magnetic member 50 may be formed of ferromagnetic material such as silicon steel and suitably joined by cement 15 to the respective ends of the sides 12—12. The magnetic member 50 is slotted as indicated at 51—51 with the slots opening outwardly and providing reduced sections 52—52 along the common portion of the E-shaped section which are saturated on the flow of predetermined alternating current in the conductor 10. The magnetic member 50 has a central leg or outstanding winding receiving section 53 on which a winding 54 is located for induction therein of alternating current. A permanent magnet 55 is located opposite the distal end of the central leg 53 to provide an arrangement in conjunction with the saturating sections 52—52 to cause alternating current to be induced in the winding 54 which has a frequency twice that of the frequency of the current flowing in the conductor 10. For example, if the current flowing in the conductor 10 has a frequency of 60 cycles per second, then the frequency of the current induced in the winding 54 will be 120 cycles per second. Current responsive means 56 in the form of an ammeter, a relay winding or the like is connected for energization to the winding 54.

It has been found that, when the permanent magnet 55 is employed as described in conjunction with the central leg 53, there is a reduction in the leakage flux between the sides 12—12 of the elongated O-shaped core 11' over that which takes place in the entire absence of the permanent magnets 19—19. However, it is preferable that one or both of the permanent magnets 19—19 be employed in order to improve the efficiency of transformation of the elongated O-shaped core 11'.

FIG. 5 of the drawings shows how the elongated O-shaped cores 11 and 11' can be employed in an electric power transmission system for the differential protection of a transformer. Here it will be noted that the reference character 60 designates, generally, an alternating current electric power system which may operate at a frequency of 60 cycles per second. This is indicated as being a frequency $f$. The electric power system 60 includes a power supply circuit represented by conductors 61—61. It will be understood that the power supply circuit 61—61 can be a single phase circuit or a polyphase circuit and that one of the conductors may be grounded in accordance with conventional practice or that a neutral point of the system can be grounded. The power supply circuit 61—61 is connected by a normally closed circuit interrupter 62 to energize a primary winding 63 of a power transformer that is indicated, generally, at 64. It will be understood that power transformer 64 is either a single phase transformer or a polyphase transformer, depending upon whether the power supply circuit is a single phase or a polyphase circuit. The power transformer 63 includes a secondary winding 65 that is connected to energize a load circuit represented by the conductors 66—66. As indicated in the drawing the load circuit 66—66 has the frequency $f$ applied thereto. Conventional trip means capable of being electrically operated are employed for controlling the opening of the circuit interrupter 62. Other equally conventional means are employed for closing the circuit interrupter 62. The trip means includes a trip winding or coil 67 that can be energized from any suitable source such as the battery 68. It will be understood that any other source available can be used and that energy for operating the trip means 67 can be derived from the load circuit 66—66, if desired. The trip circuit is completed by the closure of normally open contacts 69 as the result of movement of a bridging contact 70 into engagement therewith. Any suitable means can be employed for operating the bridging contact 70. As illustrated, a relay winding 71 can be used for this purpose. The relay operated by the winding 71 may be a polarized relay when its operation depends upon the flow of a direct current component. Otherwise it may be operable on alternating current.

It will be observed that the elongated O-shaped core 11 is in close proximity to one of the conductors 61 and that the elongated O-shaped core 11' is in close proximity to one of the conductors 66. As indicated in FIG. 5 a frequency $f$ is supplied by the winding 17 on the core 11' while the frequency of $2f$ is supplied by the winding 54. The winding 17 is connected through a non-linear resistor 72 to the relay winding 71 which is connected to a phase shifter 73 which is connected across the winding 54. A return conductor 74 interconnects the phase shifter 73 and the winding 17. A capacitor 75 shunts the winding 71 to bypass the flow of alternating current.

The phase shifter 73 is adjusted to the end that the double frequency or second harmonic $2f$ is normally 90° out of phase with the fundamental frequency $f$ when the electric power system 60 is functioning normally. Under these conditions no direct current potential appears and no direct current flows through the relay winding 71. The alternating current flowing in the circuit between the windings 17 and 54 is bypassed by capacitor 75.

Assuming now that a fault develops in the power transformer 64 involving one or more short circuited turns of the primary winding 63 or of the secondary winding 65, there will be shift in the phase of the current flow in the secondary winding 65 and the load circuit 66—66 with respect to the phase of the current flow in the primary winding 63 and power supply circuit 61—61. This phase shift will be reflected in a shift in the phase of the frequency $f$ with respect to the phase of the frequency $2f$ as supplied by the windings 17 and 54. As described in my Patent No. 3,004,381, issued October 17, 1961, this phase shift from a condition where the fundamental frequency $f$ is normally 90° out of phase with its second harmonic $2f$, causes a flow of direct current component through the non-linear resistor 72 the magnitude of which is a function of the degree of phase shift with a maximum change taking place as the phase is shifted from the 90° position. Accordingly, under these conditions sufficient direct current flows through the relay winding 71 to operate the bridging contact 70 to the closed position with the result that the normally open contacts 69 are bridged, trip coil 67 is energized and the circuit interrupter 62 is tripped.

FIG. 6 shows a modification of the system illustrated in FIG. 5 and is employed where it is desired to use only the elongated O-shaped core 11 and winding 17 thereon for over current protection. Here the winding 17 is connected directly to the relay winding 71 for energizing it on flow of predetermined current in the conductor 61 associated with the core 11. If it is desired to employ the O-shaped core 11' instead of the core 11, such an arrangement can be used with the winding 71 then being energized at double the frequency of the alternating current electric power system 60. When the double frequency is employed for directly energizing the relay winding 71, it has the advantage that the action is quicker than that which is obtained when the core 11 is used since the time of response to an increase in current flow in the electric power system 60 is decreased because of the use of the double frequency or second harmonic provided by the winding 54 energized in the manner described.

In FIG. 7 of the drawings the elongated O-shaped core 11 is shown as being located in close proximity to the high voltage alternating current conductor 10 but not surrounding it as it is shown in certain of the preceding figures. It has been found that by placing the core 11 in close proximity to the conductor 10 and in the magnetic field generated by current flow therethrough with the yoke 13 being formed of non-magnetic material sufficient magnetic flux is induced into the core 11 for energizing the winding 17 thereon. In addition by placing the core 11 in close proximity to the conductor 10 and placing the other end in spaced relation thereto and grounding it, advantage can be taken of the flow of leakage current through the core 11 for making voltage measurements and for combining the voltage and current measurements for certain purposes that now will be described.

It will be observed in FIG. 7 that the ammeter 18 has its operating winding 18' connected for energization to the winding 17. In this embodiment of the invention the winding 18 is connected in series circuit relation with the current winding 76' of a wattmeter 76 and also in series circuit relation with a current winding 77' of a power factor meter 77. The wattmeter 76 has a voltage winding 76" and the power factor meter 77 has a voltage winding 77". These windings are connected in parallel with an operating winding 78' of a volt meter 78 and they are connected between a conductor 78 which is connected to the yoke 14 at the lower end of the core 11. The other sides of the voltage windings 76", 77" and 78' are connected to ground as indicated at 80. Thus the leakage current flowing through the core 11 is applied to these voltage windings and it is proportional to the voltage of the conductor 10 with respect to ground. Accordingly, the scale of the volt meter 78 can be calibrated in volts. The wattmeter 76 can have its scale calibrated in watts and the power factor meter 77 can have its scale calibrated in degrees either side of a zero center position, as is conventional practice, for the purpose of showing the phase relationship between the current flowing in the winding 17 and the leakage current flowing to ground 80 as measured by the voltage winding 77". By suitable phase shift in the various circuits, it is possible to have the wattmeter 76 and the power factor meter 77 accurately indicate the power flow in the conductor 10 and the phase relationship between the current flowing therein and the voltage between the conductor 10 and ground or between the conductor 10 and another conductor as may be desired.

It will be understood that the circuitry associated with the winding 17 and the ground connection to the yoke 14, as shown in FIG. 7, can be employed in a similar fashion with the core 11, FIG. 1, where it mechanically links the conductor 10.

If desired, the core 11, FIG. 7, can be housed in an insulator 24 as illustrated in FIG. 2. In such case the cap 28 preferably is formed of non-magnetic material, such as copper or brass, to provide the closure at the upper end of the insulator 24.

What is claimed as new is:

1. Means responsive to the flow of alternating current in a conductor energized at a voltage of the order of several thousand volts comprising, in combination, an elongated generally O-shaped core having its sides formed of ferromagnetic ceramic material of the ferrite type having relatively high resistivity and high magnetic permeability, said core being positioned in close proximity to said conductor to link the magnetic field generated by alternating current flow therethrough whereby said core is energized at said one end substantially at the voltage of said conductor and it has alternating magnetic flux induced therein, winding means linking the other end of said O-shaped core for induction therein of alternating current varying in magnitude in accordance with the current flow in said conductor, and current responsive means connected to said winding means.

2. Means responisve to the flow of alternating current in a conductor energized at a voltage of the order of several thousand volts comprising, in combination, an elongated generally O-shaped core having its sides formed of ferromagnetic ceramic material of the ferrite type having relatively high resistivity and high magnetic permeability, said core being positioned in close proximity to said conductor to link the magnetic field generated by alternating current flow therethrough whereby said core is energized at said one end substantially at the voltage of said conductor and it has alternating magnetic flux induced therein, means for grounding the other end of said elongated generally O-shaped core, winding means linking the grounded end of said O-shaped core for induction therein of alternating current varying in magnitude in accordance with the current flow in said conductor, and current responsive means connected to said winding means.

3. Means responsive to the flow of alternating current in a conductor energized at a voltage of the order of several thousand volts comprising, in combination, an elongated generally O-shaped core having its sides formed of ferromagnetic ceramic material of the ferrite type having relatively high resistivity and high magnetic permeability, said core being positioned in close proximity to said conductor to link the magnetic field generated by alternating current flow therethrough whereby said core is energized at said one end substantially at the voltage of said conductor and it has alternating magnetic flux induced therein, means providing a unidirectional magnetic field between said sides of said core intermediate their ends to reduce the leakage of alternating magnetic flux therebetween, winding means linking the other end of said O-shaped core for induction therein of alternating current varying in magnitude in accordance with the current flow in said conductor, and current responsive means connected to said winding means.

4. Means responsive to the flow of alternating current in a conductor energized at a voltage of the order of several thousand volts comprising, in combination, an elongated generally O-shaped core having its sides formed of ferromagnetic ceramic material of the ferrite type having relatively high resistivity and high magnetic permeability, said core being position in close proximity to said conductor to link the magnetic field generated by alternating current flow therethrough whereby said core is energized at said one end substantially at the voltage of said conductor and it has alternating magnetic flux induced therein, means providing a unidirectional magnetic field between said sides of said core intermediate their ends to reduce the leakage of alternating magnetic flux therebetween, means for grounding the other end of said elongated generally O-shaped core, winding means linking the grounded end of said O-shaped core for induction therein of alternating current varying in magnitude in accordance with the current flow in said conductor, and current responsive means connected to said winding means.

5. The invention, as set forth in claim 4, wherein the means providing the unidirectional field is a ceramic permanent magnet whereby the resistance between the conductor and ground is not substantially changed by the presence of the permanent magnet.

6. Means responsive to the flow of alternating current in a conductor energized at a voltage of the order of several thousand volts comprising, in combination, an elongated generally O-shaped core having its sides formed of ferromagnetic ceramic material of the ferrite type having relatively high resistivity and high magnetic permeability, said core being positioned in close proximity to said conductor to link the magnetic field generated by alternating current flow therethrough whereby said core is energized at said one end substantially at the voltage of said conductor and it has alternating magnetic flux induced therein, means providing a pair of unidirectional magnetic fields between said sides of said core intermediate their ends both acting in the same direction to reduce the leakage of alternating magnetic flux between said sides, winding means linking the other end of said O-shaped core for induction therein of alternating current varying in magnitude in accordance with the current flow in said conductor, and current responsive means connected to said winding means.

7. Means responsive to the flow of alternating current in a conductor energized at a voltage of the order of several thousand volts comprising, in combination, an elongated generally O-shaped core having its sides formed of ferromagnetic ceramic material of the ferrite type having relatively high resistivity and a high magnetic permeability, said core being positioned in close proximity to said conductor to link the magnetic field generated by alternating current flow therethrough whereby said core is energized at said one end substantially at the voltage of said conductor and it has alternating magnetic flux induced therein, an insulator enclosing said sides of said O-shaped core to protect the same from the weather, winding means linking the other end of said O-shaped core for induction therein of alternating current varying in magnitude in accordance with the current flow in said conductor, and current responsive means connected to said winding means.

8. The invention, as set forth in claim 7, wherein the electrical resistance of the insulator is at least equal to the resistance of the sides of the O-shaped core.

9. The invention, as set forth in claim 8, wherein the insulator is of ceramic material and it and the sides of the O-shaped core are of integral construction.

10. The invention, as set forth in claim 7, wherein end caps of ferromagnetic material overlie the ends of the insulator and complete the magnetic circuit between the respective ends of the sides of the O-shaped core.

11. Means responsive to the flow of alternating current in a conductor energized at a voltage of the order of several thousand volts comprising, in combination, an elongated generally O-shaped core having its sides formed of ferromagnetic ceramic material of the ferrite type having relatively high resistivity and high magnetic permeability, said core being positioned in close proximity to said conductor to link the magnetic field generated by alternating current flow therethrough whereby said core is energized at said one end substantially at the voltage of said conductor and it has alternating magnetic flux induced therein, the other end of said core including a section that saturates on flow of predetermined alternating current in said conductor and an outstanding winding receiving section, means causing a unidirectional magnetic flux in said outstanding winding receiving section, a winding on said winding receiving section into which alternating current is induced having a frequency twice that of the alternating current in said conductor and varying in magnitude in accordance with the current flow in said conductor, and current responsive means connected to said winding.

12. Means responsive to the flow of alternating current in a conductor energized at a voltage of the order of several thousand volts comprising, in combination, an elongated generally O-shaped core having its sides formed of ferromagnetic ceramic material of the ferrite type having relatively high resistivity and high magnetic permeability, said core being positioned in close proximity to said conductor to link the magnetic field generated by alternating current flow therethrough whereby said core is energized at said one end substantially at the voltage of said conductor and it has alternating magnetic flux induced therein, the other end of said core being formed by an outstanding generally E-shaped section the common portion of which is saturated with alternating flux on flow of predetermined alternating current in said conductor, means causing a unidirectional magnetic flux in the central leg of said E-shaped section, and a winding on said central leg into which alternating current is induced having a frequency twice that of the alternating current in said conductor.

13. Means responsive to the flow of alternating current in a conductor energized at a voltage of the order of several thousand volts comprising, in combination, an elongated generally O-shaped core having its sides formed of magnetic material having relatively high resistivity and high magnetic permeability, said core being positioned in close proximity to said conductor to link the magnetic field generated by alternating current flow therethrough whereby said core is energized at said one end substantially at the voltage of said conductor and it has alternating magnetic flux induced therein, winding means linking the other end of said O-shaped core for induction therein of alternating current varying in magnitude in accordance with the current flow in said conductor, and current responsive means connected to said winding means.

14. In an electric power transmission system operating at a voltage of the order of several thousand volts and comprising an alternating current power supply circuit and a load circuit, circuit interrupter means interconnecting said circuits and trip means therefor, an elongated generally O-shaped magnetic core having its sides formed of magnetic material having relatively high resistivity and high magnetic permeability, said core being positioned in close proximity to a conductor of one of said circuits to link the magnetic field generated by alternating current flow therethrough whereby said core is energized at said one end substantially at the voltage of said conductor and it has alternating magnetic flux induced therein, and winding means on the other end of said elongated O-shaped magnetic core for induction therein of alternating current varying in magnitude in accordance with the current flow in said conductor and connected to said trip means to operate the same and open said circuit interrupter upon predetermined flow of current in said conductor.

15. In an electric power transmission system operating at a voltage of the order of several thousand volts and comprising an alternating current power supply circuit and a load circuit, circuit interrupter means interconnecting said circuits and trip means therefor, a pair of elongated generally O-shaped magnetic cores each having its sides formed of magnetic material having relatively high resistivity and high magnetic permeability, each core being positioned in close proximity to a conductor of one of said circuits to link the magnetic field generated by alternating current flow through the respective conductor whereby each core is energized at its said one end substantially at the voltage of the respective conductor and each has alternating magnetic flux induced therein, winding means on the other end of each of said elongated O-shaped magnetic cores for induction therein of alternating currents varying in magnitude in accordance with the current flow in the respective conductor, and means interconnecting said winding means and said trip means whereby the latter is operated to open said circuit interrupter upon predetermined difference in the flow of current in the respective conductors of said circuits.

16. The invention, as set forth in claim 15, wherein one of the cores is arranged and constructed at the other end to induce in the winding means thereon alternating current having a frequency twice that induced in the other winding means, circuit means including non-linear resistance means interconnect said winding means and the trip means, and a phase shifter is interposed in said circuit means.

17. Means responsive to the flow of alternating current in a conductor energized at a voltage of the order of several thousand volts comprising, in combination, an elongated generally O-shaped core having its sides formed of ferromagnetic ceramic material of the ferrite type having relatively high resistivity and high magnetic permeability, said core being positioned in close proximity to said conductor to link the magnetic field generated by alternating current flow therethrough whereby said core is energized at said one end substantially at the voltage of said conductor and it has alternating magnetic flux induced therein, circuit means for grounding the other end of said elongated generally O-shaped core, current responsive means in said circuit means for measuring current flow therein as a function of the voltage between said conductor and ground, winding means linking the grounded end of said O-shaped core for induction therein of alternating current varying in magnitude in accordance with the current flow in said conductor, and current responsive means connected to said winding means.

18. The invention, as set forth in claim 17, wherein measuring means are provided responsive jointly to the current flow in the circuit means and the current flow in the winding means.

19. The invention, as set forth in claim 18, wherein the measuring means is a wattmeter.

20. The invention, as set forth in claim 18, wherein the measuring means is a power factor meter.

No references cited.